United States Patent
Boutemy et al.

(10) Patent No.: US 7,873,429 B2
(45) Date of Patent: Jan. 18, 2011

(54) NETWORK PRODUCTION PLANNING METHOD

(75) Inventors: Florence Boutemy, Paris (FR); Boris Pachany, Paris (FR); Tom Van de Weghe, Sint-Joost-ten-Node (BE); Sonia Garcia Del Cerro, Madrid (ES)

(73) Assignee: L'Air Liquide, Societe Anonyme a Directoire et Conseil de Surveillance pour l'Etude et l'Exploitation des Procedes Georges Clause, Paris (FR)

( * ) Notice: Subject to any disclaimer, the term of this patent is extended or adjusted under 35 U.S.C. 154(b) by 885 days.

(21) Appl. No.: 11/298,787

(22) Filed: Dec. 9, 2005

(65) Prior Publication Data

US 2006/0190113 A1 Aug. 24, 2006

Related U.S. Application Data

(60) Provisional application No. 60/635,260, filed on Dec. 10, 2004.

(51) Int. Cl.
*G06F 19/00* (2006.01)

(52) U.S. Cl. .......................... 700/97; 700/106
(58) Field of Classification Search ............. 700/95–97, 700/99, 100, 106; 705/7–10
See application file for complete search history.

(56) References Cited

U.S. PATENT DOCUMENTS

| | | | |
|---|---|---|---|
| 3,079,079 A | | 2/1963 | Phister et al. |
| 3,703,630 A | * | 11/1972 | Gelder ........................... 705/7 |
| 4,208,712 A | | 6/1980 | Deutsch |
| 5,280,425 A | * | 1/1994 | Hogge .......................... 712/300 |
| 5,630,070 A | * | 5/1997 | Dietrich et al. ................. 705/8 |
| 5,765,137 A | * | 6/1998 | Lee ................................. 705/7 |
| 6,546,300 B1 | * | 4/2003 | Fukuda et al. .............. 700/100 |
| 6,876,948 B1 | * | 4/2005 | Smith .......................... 702/181 |
| 7,058,587 B1 | * | 6/2006 | Horne ............................. 705/7 |
| 2002/0017113 A1 | | 2/2002 | Seiver et al. |
| 2003/0014287 A1 | * | 1/2003 | Williams et al. ................ 705/7 |
| 2003/0050870 A1 | * | 3/2003 | Cargille et al. ................ 705/28 |
| 2004/0148264 A1 | | 7/2004 | Megan et al. |
| 2005/0114237 A1 | * | 5/2005 | Urso ........................... 705/28 |
| 2005/0131779 A1 | * | 6/2005 | Kitamura et al. .............. 705/29 |
| 2006/0010018 A1 | * | 1/2006 | Bouriant ........................ 705/7 |
| 2006/0277086 A1 | * | 12/2006 | Ball et al. ...................... 705/8 |

\* cited by examiner

*Primary Examiner*—M. N. Von Buhr
(74) *Attorney, Agent, or Firm*—Elwood L. Haynes

(57) ABSTRACT

Methods of production planning, including a novel method of optimized production planning for a plurality of production plants producing a product for delivery to a plurality of customers using a common distribution network, wherein the product consumption by customers can vary, and the variable cost of producing the product can vary between production plants, over time, and production quantity. The method maximizes profitability by characterizing raw material costs over varying production rates and minimizing variable cost across the network for any given production demand. The method considers the variable cost of producing product in varying production quantities, the variable cost structure of raw material supplies, and how these variable costs vary between production plants. The method also considers the variable cost impact of purchasing product from outside sources. The method produces monthly, weekly, daily, or hourly production plans and can automatically set target production quantities for each production plant to provide the lowest variable cost plan for a given production demand.

27 Claims, 5 Drawing Sheets

NETWORK PRODUCTION PLANNING METHOD

CROSS-REFERENCE TO RELATED APPLICATIONS

This application is a U.S. Non Provisional patent application, which is related to and claims the benefit of U.S. Provisional Application No. 60/635,260, filed Dec. 10, 2004, entitled "Optimization of H$_2$/CO Production."

BACKGROUND

Petrochemical product suppliers often produce product at a number of plant production locations and distribute product using a common distribution system that connects multiple production plants to multiple customers. For example, hydrogen, carbon monoxide, and syngas are typically produced in synthesis gas plants in various locations, often close to raw material sources. These synthesis gas plants are often linked together and to multiple customers via a common distribution system, such as a pipeline system or a series of pipelines. The common distribution system may be made of several sub-distribution systems that are or are physically separate from the main distribution system.

Product in the distribution system can come from any one of the multiple production units; thus, a system must be used to allocate production between the various production units. The efficient allocation of production can be very complex due to the variable costs, such as raw materials, energy, capacities, operating efficiencies, or plant availability on any given day.

Production planning is important to providing product to customers while maintaining profitability. Product in the distribution system can be used by any of a number of customers, and at varying rates. Furthermore, raw material supply contracts, such as natural gas and electricity, typically include take-or-pay arrangements, variable pricing based on usage and energy market, and/or price penalties for exceeding contracted usage rates. Production demand is allocated among multiple production plants based on system inventory, plant availability, plant efficiencies, variable costs, and expected customer demand. Prior art production planning methods typically use a linear model based on monthly average cost to produce a production plan. Furthermore, typical prior art methods assume that raw material costs are constant over varying production rates. Thus, the prior art methods do not necessarily minimize the cost of production.

In many petrochemical distribution systems, the demand at any given time can vary from the target contracted amount and can change almost instantly. Thus, many distribution networks are monitored for real-time demand on the system by monitoring parameters, such as pipeline pressure or flow. The distribution system must maintain a "network buffer" (i.e.: a reserve capacity or extra storage of product) to respond to any changes in customer demand. A properly controlled distribution system will maintain sufficient product flows and pressure to supply all customers and assure that no customer loses supply. While traditional approaches to production planning assure that customer demands are met by maintaining a sufficiently large enough network buffer and overproducing product, they do not guarantee that the buffer will be maintained with the lowest operating cost.

Profitability of networked production operations is driven by allocation of production to the various plants in such a manner as to minimize the raw material and energy costs, which are typically the major variable cost components of the system overall. It can be a complex and daunting task to profitably allocate production, as variable costs can vary between plants, and can vary from day to day in each plant. As a result, many networked production systems are operated based on the average variable cost of a plant, which will not minimize the variable cost across the system for a given time period.

Profitability is also significantly affected by additional production demand that results in variations in variable costs. The additional production demand may be due to unplanned consumption by the customer, customers exceeding contracted usage, or other circumstances. Providing product to meet the addition production demand can result in deviations from raw material supply contracts. This can result in substantial, usually negative, variable cost impacts as the production plant is forced to deviate from the contracted amounts for raw material to support the additional production demand. This deviation in variable cost can also vary between plant locations. Traditional production planning systems do not adequately address the affects of this additional production demand on production planning and the difference between operating plants in the costs created by the additional demand.

In light of the foregoing problems associated with minimizing variable costs, a need exists for an improved method of production planning, wherein the variable costs of each plant in a networked system can be monitored and production plans produced that minimize the variable cost across the network over a period of time (a time step) as the production demand varies. Furthermore, there is a need for a production planning system, wherein costs for base contract production and differential costs created by differential production demand can be monitored and minimized across the total distribution network. A need also exists to facilitate reporting and simulate future investments and evolution on the network.

SUMMARY

The present invention provides a method of planning and/or controlling production across a number of production plants sharing a common distribution network and distributing product to a number of customers in such manner as the variable cost of production across the sum of the distribution network and production plants is minimized at all production levels. In accordance with the method, a plurality of production plants and a distribution network are linked to a production planning system. The method obtains a plurality of planning data values and a plurality of current data values. The method calculates the cost of production for each production plant and across the total distribution network over a specified time step at the given production demands levels. The production planning system allows the optimization the operation of the production plants, distribution network, and the purchases from the outside sources to minimize the total network variable cost over the specified production period for the given demand levels. The method then outputs the plant production quantity to use as a production plan for manual or automatic control of the production and distribution network operations. An update of the production planning can be generated for every time interval of the defined period. The method allows the user to simulate raw materials purchasing contracts clauses and operational costs.

In order to minimize the total network variable cost, the method:

a) links the production plants and a distribution network to a production planning system;

b) obtains planning data values for a time step comprising:
   i) a raw material cost structure;
   ii) a value of a by-product for each of the production plants;
   iii) a forecast consumption for each of the customers;
   iv) a forecast production availability for each of the production plants or a forced production plan;
   v) a production capacity for each of the production units;
   vi) a process operating parameter for each of the production units;
   vii) a network operating parameter;
   viii) a cost of purchased product; and
   xi) an availability of purchased product;
c) reads a plurality of current data values comprising:
   i) a real-time production rate for each of the production plants;
   ii) a real-time consumption for each of the customers; and
   iii) a real-time network operating parameters;
d) reads a plurality of past data values comprising:
   i) a past consumption for raw material; and
   ii) a past parameter for raw material
   iii) inputting the planning data values and the current data values into the production planning system;
   iv) calculating;
   v) a total network production quantity;
   vi) the total network variable cost; and
e) outputs the plant production quantity for each of the production plants.

Other preferred embodiments of the method provide a purchased production quantity, and further detailed cost analysis for the total production/distribution system. Furthermore, the planning system in one preferred embodiment comprises a plant cost program, a network production optimization program, and a network real-time operation program, wherein the specific cost and planning values are calculated using cost models and planning optimizers. Other embodiments provide for controlling the production setpoint to produce the plant production quantity outputted by the production planning system. Still other embodiments provide for setting a local automated control system setpoint manually or automatically to produce the calculated plant production quantity of a production plant. Furthermore, some embodiments provide for continually reading current data, calculating new total production quantities, and updating the plant production quantity of at least one of the production plant. Other embodiments continually read network operating parameters, real time operating parameters, and/or real-time consumption for customers, while other embodiments allow the simulation of production costs for a given strategy of production. Still other embodiments allow the simulation of different structures and clauses for raw material purchase contracts.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and, wherein.

DESCRIPTION

Figure 1:
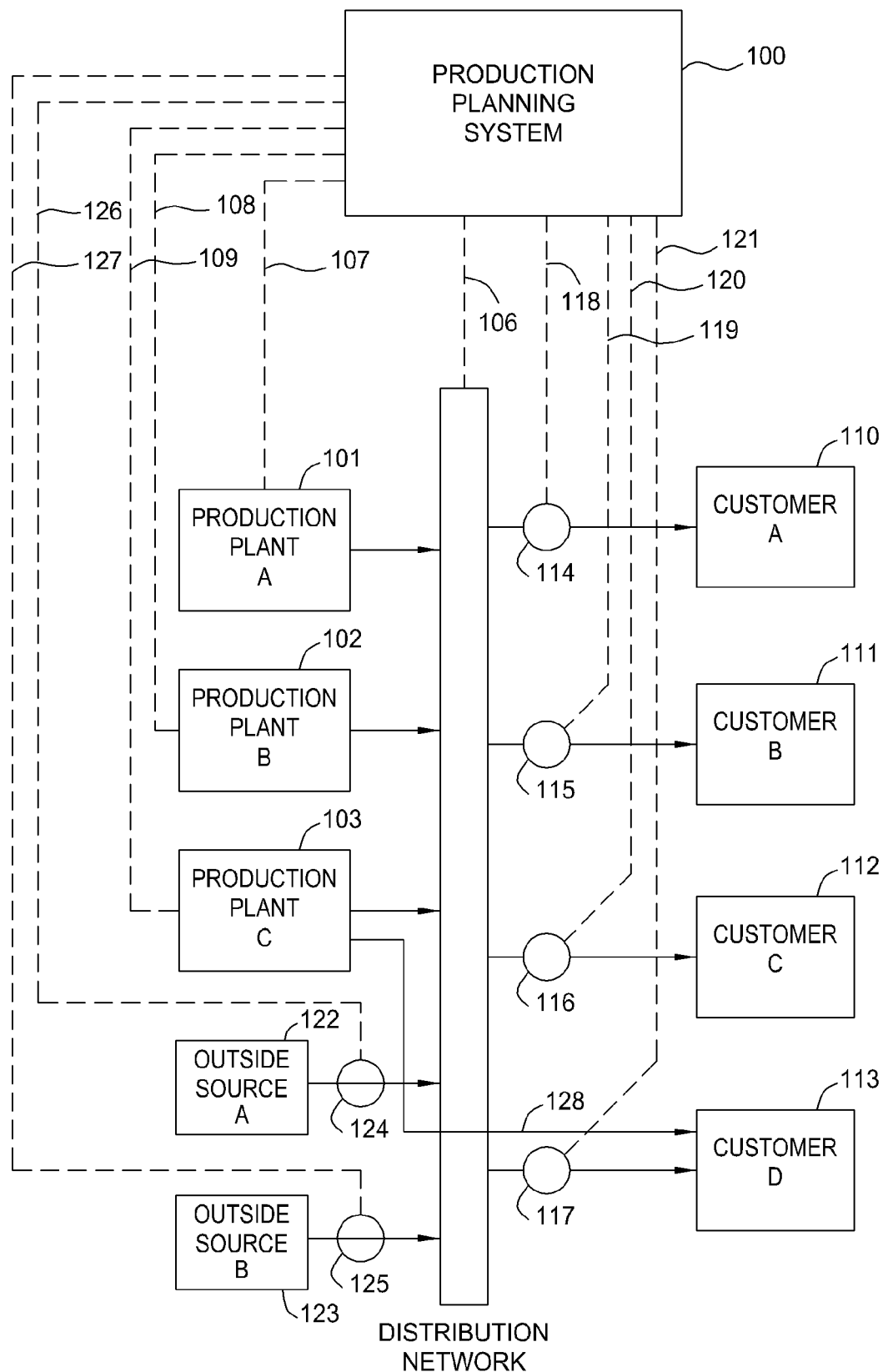
FIG. 1 is a schematic of a planning system, production plants, and customers according to one embodiment of the invention.

The current invention provides a method of providing a production plan for a network of production plants and a distribution network to produce and distribute product to customers while minimizing variable costs over a time step. In accordance with the method, a plurality of production plants and a distribution network are linked to a production planning system. The method obtains a plurality of planning data values 210, a plurality of current data values 220, and a plurality of past data values 230 including past consumption for raw materials 232 and a past parameter for raw materials 234. The method inputs the planning data values and current data values into the production planning system, and executes a planning program. The planning program calculates a number of production control parameters over a time step. By executing the planning program, the production planning system obtains a plant production quantity 202 to be produced by each of the production plants/unit over the selected time step. As used herein, a production plant refers to a total production plant, which may comprise of a number of production units, or may refer to a single production plant that comprises a single unit. The inputs and outputs of the current invention may be for the total plant, or may be broken down into interconnected units within a single plant. The time step may be an hour, day, week, month, or other desired time step. The production planning system allocates the production among the production plants to minimize the total network variable cost. By controlling the production plants and distribution network in accordance with the updated production plan, the aggregate of variable cost across the sum of the plants and distribution network is minimized over the specified time step. The update of the production plan is done every time step.

Minimizing network variable cost may be constrained by a distribution network parameter. For instance, high demand at one end of a pipeline and requirements for maintaining a minimum pressure in the pipeline, coupled with a production unit located at the far end of a pipeline, may constrain the distribution network from using the lowest cost production plant for meeting the extra demand. To maintain pressure, production may have to come from a closer production plant, even though the variable costs are higher at that plant. Thus, as used herein, minimizing any cost by the production planning system comes only after meeting the prerequisite of operating the distribution network within constraints and supplying the customers.

The method is particularly suitable for developing a production plan to meet a plurality of customer demands 912 over a network of pipelines as the distribution network to supply a plurality of products, such as $H_2$, CO, syngas, $CO_2$, and/or steam, from a plurality of production plants at the cheapest overall aggregated cost over a time step. The aggregated cost is minimized for each plant by characterizing all variable costs 906, including raw material costs. In particular, the aggregated cost 904 is minimized over a range of production rates as the production rates vary to meet customer demand. The production planning method determines the optimum way the production should be allocated among the sources of production of the network so as to minimize variable cost over the time period. The method develops a production plan that coordinates short-term (e.g. daily) and midterm issues (e.g. quarter) to minimize the overall cost of production. The method provides an optimal production plan that meets customer demands for products, meets the contractual, process, and availabilities limits, and minimizes aggregated cost of production across the production plants and distribution network for the desired time period. The total production cost is the sum of costs for all plants, for all timesteps, and all utilities.

The minimal cost over the desired time period may require operation in a non-optimal mode over a shorter time period. For instance, in one embodiment of the method, a production plan for a quarterly time period minimizes variable cost over the quarter by accounting for the effect of raw material contracts with a quarterly time horizon and customer demand with a weekly time horizon. The method accurately determines the costs of key raw materials (i.e., natural gas or $H_2$ for syngas production) for each time step depending on relevant cost factors such as past consumption, the likelihood of reaching the take-or-pay volume for a given time step, actual flow rate, and contract cost penalties (if the flow is beyond contract limits). The method determines the lowest cost scenario over a quarter, which may be different from the lowest cost scenario over any one week.

Furthermore, the current method provides additional benefits by:
  checking the impact on the production/distribution network management and costs of simulated cases (new customer, new source, increase in price, raw material costs, new structure of price of raw material, plant revamping);
  providing the actual cost of production;
  updating the production plan at anytime to include the impact of changes in the production/distribution network;
  including the cost impact of by products (i.e., the cost impact of producing $CO_2$, NOx, SOx, and other gases when operating a network of plants supplying $H_2$, CO, and syngas);
  providing a database to follow-up key raw material purchases;
  providing a report (intelligent alarm) on the gap between a production plan and actual production; and
  providing a method of autotuning of plants models following actual deviation from the models.

Referring to FIG. 1, a plurality of production plants 101, 102, 103 and a distribution network 104 provide data to a production planning system 100 via a production link 106, 107, 108, 109. Production plants 101, 102, 103 can be any type of product manufacturing plant. In one embodiment, the production plants are preferably petrochemical plants or industrial gas plants, and even more preferably, air separation plants, or $H_2$/CO/syngas production plants. The production link 106, 107, 108, 109 is typically an electronic link, wherein current and stored data can be sent from each production plant 101, 102, 103 to the production planning system 100. The electronic link is typically and industrial or intranet network. The data coming from the plant may or may not be stored in a data storage system. However, some data may be provided to the production planning system 100 by manually inputting data about each production plant 101, 102, 103 directly into the production planning system 100.

Again, referring to FIG. 1, the distribution network 104 delivers product produced by the production plants 101, 102, 103 to a plurality of customers 110, 111, 112. The distribution network 104 can be any distribution system known to one of skill in the art. The distribution network 104 may comprise pumps, compressors, pipeline, and other equipment that incurs costs related to the delivery of products to the customers. Alternatively, directly connected customers 113 may receive supply directly from a production plant 103 via a separate and dedicated connection 128. One embodiment of a distribution network 104 commonly used for petrochemical and industrial gas products is a pipeline. However, a system of tanks, trucks, power lines, or other delivery methods may also be used as the distribution network 104. The distribution network 104 is typically monitored for at least one distribution network parameter, such as pressure, level, flow, temperature, equipment operating state (such as a compressor on or off), or other operating parameter. This distribution network parameter is used to monitor the capability of the distribution network to supply customers 110, 111, 112, 113 with product and/or the operating cost of the distribution network. The distribution network parameter can be sent to the production planning system 100 via the production link 106 described above, or be manually input into the system.

Again, referring to FIG. 1, customers 110, 111, 112, 113 draw product from the distribution network 104 at varying rates. A demand measurement device 114, 115, 116, 117 monitors the real-time customer consumption. The demand measurement device 114, 115, 116, 117 can be any device suitable for indicating the consumption of product by each customer 110, 111, 112, 113. The demand measurement device 114, 115, 116, 117 can be part of the distribution network 104, or can be part of the respective customer's facility. The demand measurement device 114, 115, 116, 117 provides a signal or data that reflects the consumption of product by each customer via a consumption link 118, 119, 120, 121. All plant data can also be input manually if no electronic link or control device is available.

Still referring to FIG. 1, an outside source 122, 123 may also be connected into the distribution network 104 to supply product to customers 110, 111, 112, 113 this outside source 122, 123 is typically, but not necessarily, a backup or supplemental supply of product to assure that the distribution network 104 always has an adequate supply of product to provide to customers 110, 111, 112, 113. The availability of product from the outside source 122, 123 may be input into the production planning system 100 manually or automatically. In one embodiment, a supply measurement device is 124, 125 monitors the real-time outside supply rate. The supply measurement device 124, 125 can be any device suitable for indicating the supply of product by the outside source 122, 123. The supply measurement device 124, 125 can be part of the distribution network 104, or can be part of the respective supplier's facility. In one embodiment, the supply measurement device 124, 125 provides a signal or data that reflects the supply of product by the outside source via a supply link 126, 127. All plant data can also be input manually if no electronic link or control device is available.

Figure 2:
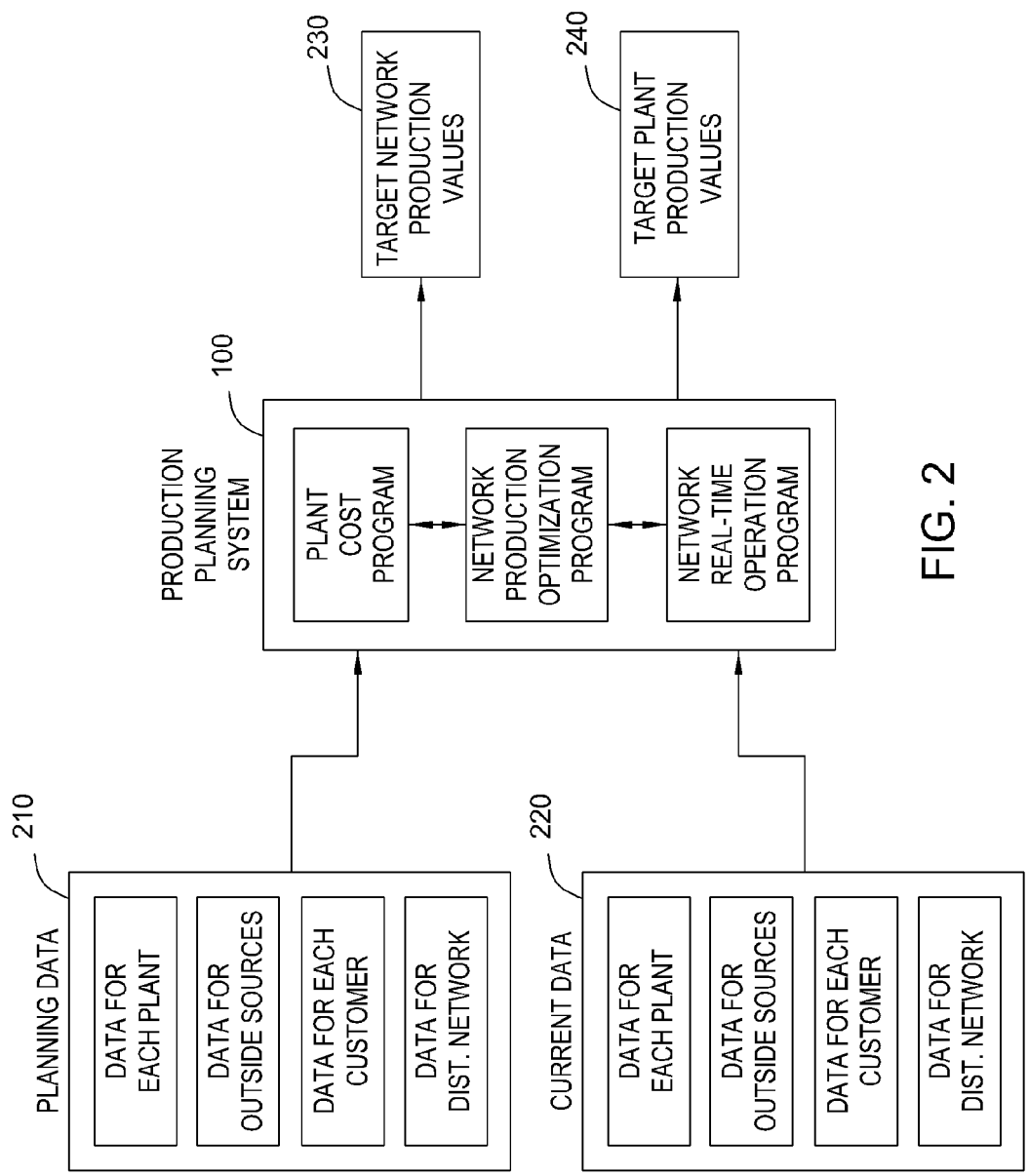
FIG. 2 is a schematic describing the production planning system according to one embodiment of the invention.

Referring to FIG. 2, the production planning system 100 obtains a plurality of planning data values 210 from the production units, distribution network, customers, and outside sources. The planning data values include, but are not limited to:

a) a raw material cost structure 204;
b) a value of a by-product for each of said production plants 206;
c) a forecast consumption for each of said customers 208;
d) a forecast production availability for each of said production plants 210;
e) a production capacity for each of said production plants 212;
f) a process operating parameter for each of said production plants 214;
g) a network operating parameter 216;
h) a cost of purchased product 218;
i) an availability of purchased product 222;
j) a past production data for each said unit/production plant; and
k) a maximum load variation factor for each said unit/production plant.

Figure 3:
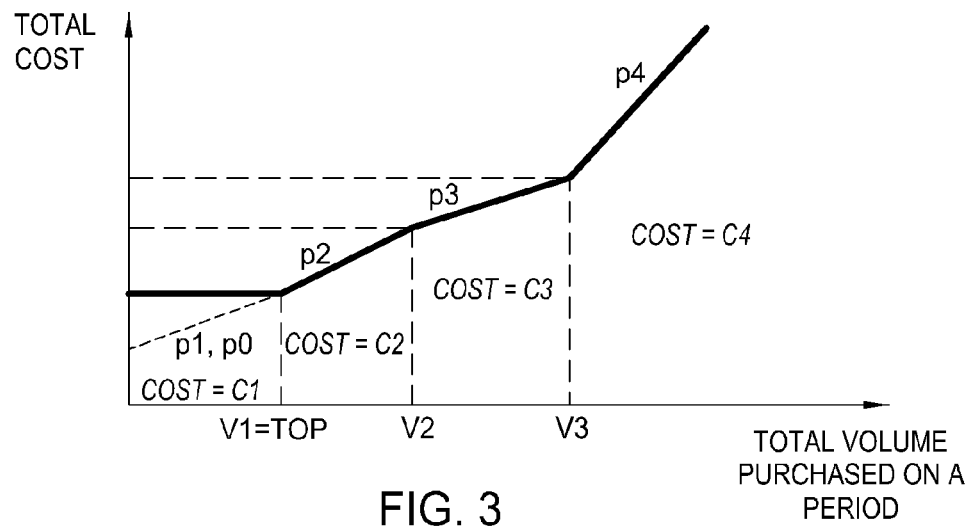
FIG. 3 is a graphical representation of a cost structure for a raw material for one embodiment of the invention.

In one preferred embodiment, a raw material cost structure is obtained by the production planning system 100. The production planning system 100 preferably, obtains at least one raw material cost structure, and more preferably obtains a plurality of raw material cost structures as required to accurately reflect the cost of the actual raw material consumption. Raw material cost structures may include any parameter of a supply contract between a production plant and a raw material supplier. A raw material cost structure may comprise a raw material price, quantity specified in a take-or-pay contract, maximum contracted consumption rate, energy adjustment, price, series of prices based on quantity of usage, forecast price for a raw material, spot price, or any other cost parameter reflecting how the price of the raw material varies with varying usage and with the situation over energy market (indexes, prices, trends). In one preferred embodiment, the raw material cost structure includes a first cost for raw material consumed within the pre-determined quantities specified in the contract, and a second cost for raw material consumed in variation from the contracted quantities. One embodiment of a raw material cost structure is shown in FIG. 3, wherein the cost structure comprises a take-or-pay level, and, wherein the raw material cost structure is represented by the formulas:

$$C_1 = p_1 * V_1 - p_0 * (V_1 - V)$$

$$C_2 = p_1 * V_1 + p_2 * (V - V_1)$$

$$C_3 = p_1 * V_1 + p_2 * (V_2 - V_1) + p_3 * (V - V_2)$$

$$C_4 = p_1 * V_1 + p_2 * (V_2 - V_1) + p_3 * (V_3 - V_2) + p_4 * (V - V_3)$$

Figure 5:
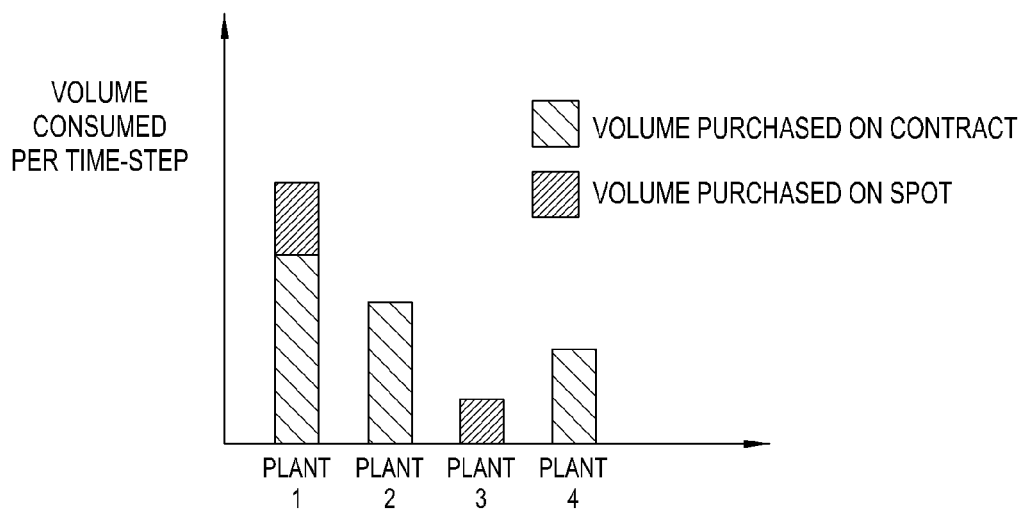
FIG. 5 is a graphical representation of a raw material cost structure for one embodiment of the invention.
Figure 6:
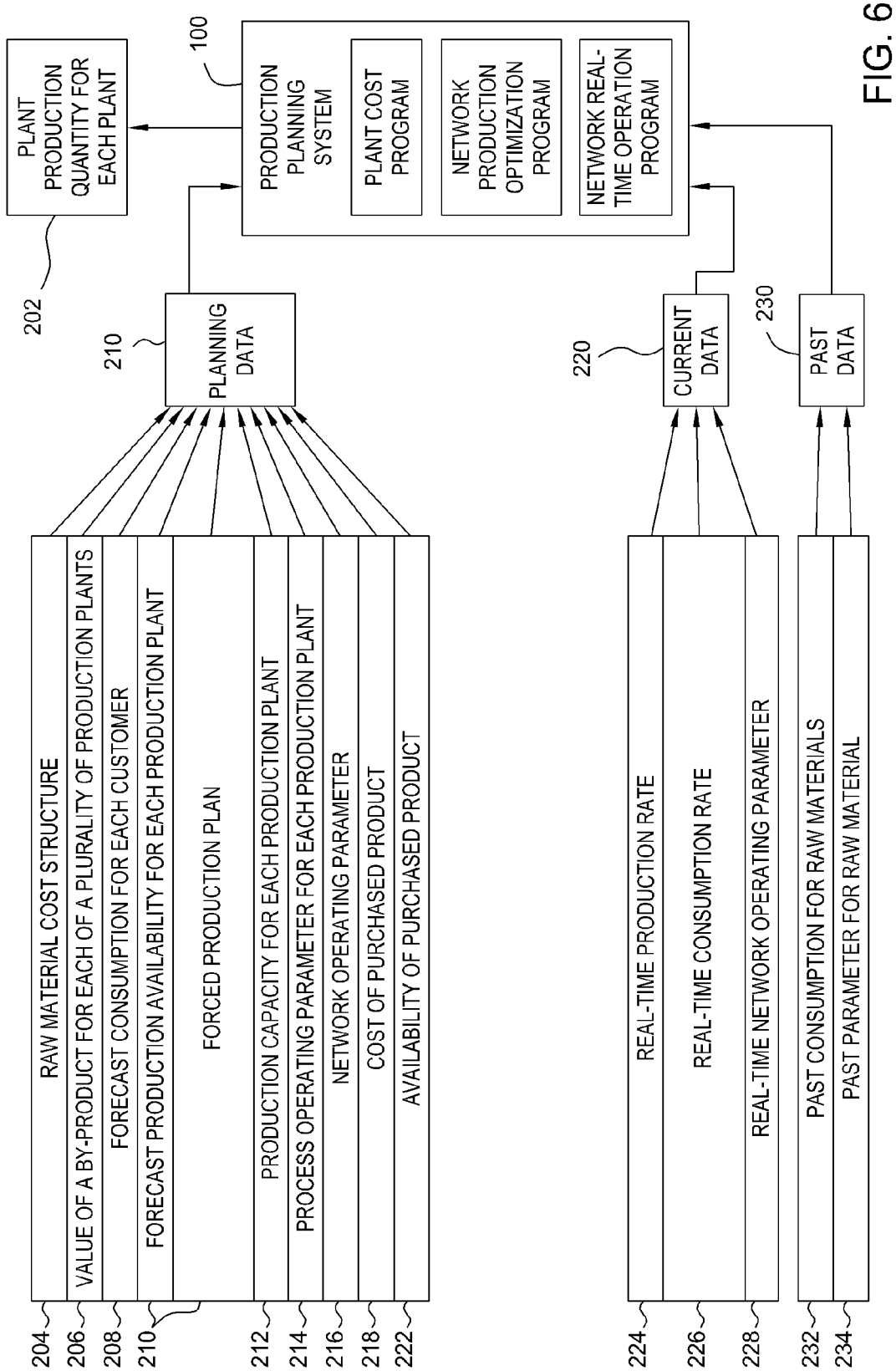
FIG. 6 is a schematic describing the production planning system according to another embodiment of the invention.
Figure 7:
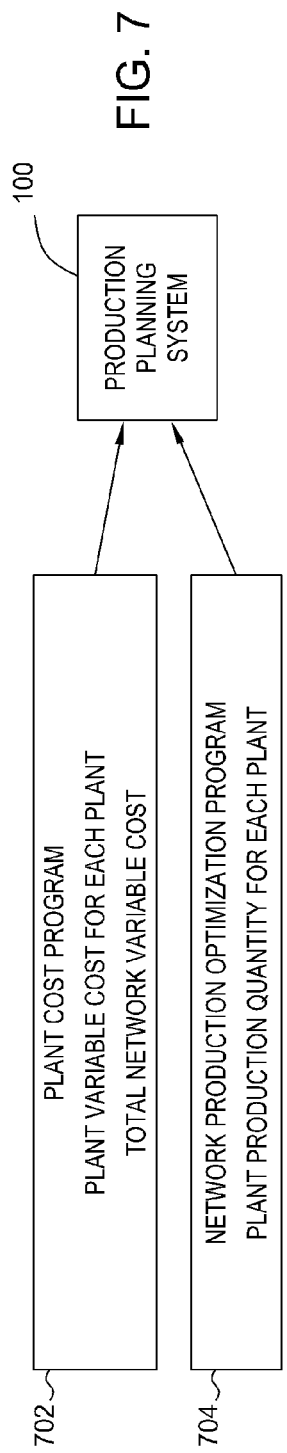
FIG. 7 is a schematic describing the production planning system according to another embodiment of the invention.
Figure 8:
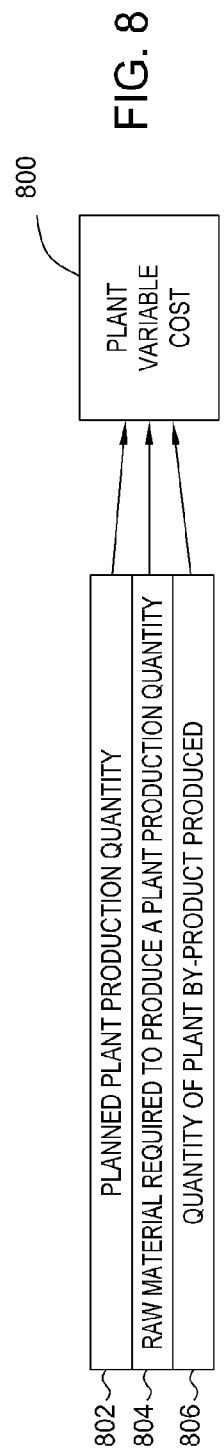
FIG. 8 is a schematic describing the plant variable cost according to one embodiment of the invention.
Figure 9:
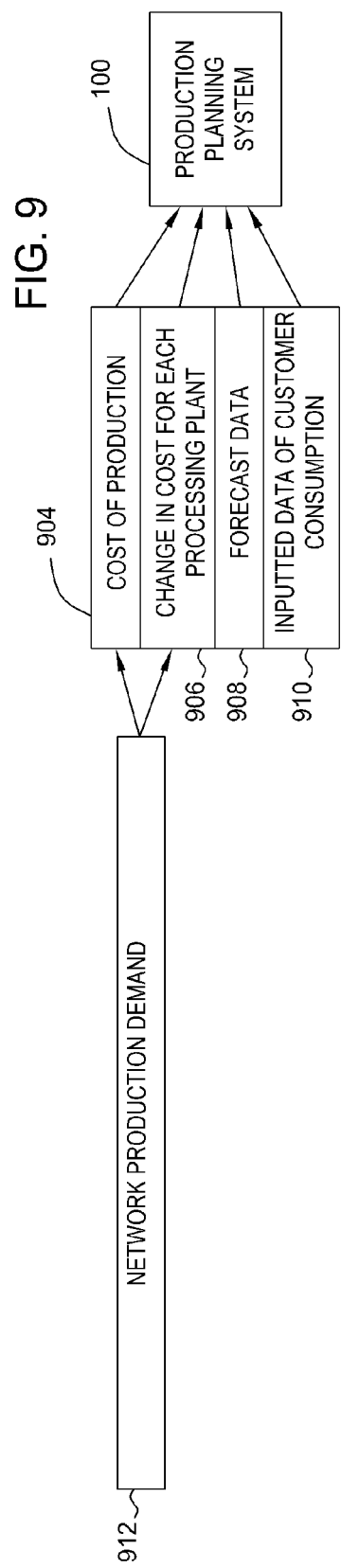
FIG. 9 is a schematic describing the network production planner according to one embodiment of the invention.

Wherein:
$C_1$ = a first cost of raw material
$V$ = an actual volume of raw material used
$V_1$ = a first volume level ($V_1$) of raw material
$p_1$ = a first price of raw material
$p_0$ = a rebate
$C_2$ = a second cost of raw material
$p_2$ = a second price of raw material
$V_2$ = a second volume level of raw material
$C_3$ = a third cost of raw material
$p_3$ = a third price of raw material
$V_3$ = a third volume level of raw material
$C_4$ = a fourth cost of raw material
$p_4$ = a fourth price of raw material
$V_4$ = a fourth volume level of raw material Another embodiment of a raw material cost structure is shown in FIG. 5, wherein the cost structure comprises a volume purchased on a contract and a volume purchased on a spot price, and, wherein the raw material cost structure is represented by the formulas:

$$C = p_{contract} \times V_{contract} + p_{spot} \times V_{spot}$$

Wherein:
$C$ = raw material cost structure
$p_{contract}$ = contract price
$V_{contract}$ = contract volume
$p_{spot}$ = spot price
$V_{spot}$ = spot volume As used herein, "raw material" includes feedstocks, utilities (such as electricity, steam, or water), or any other raw material used in producing the product. For instance, $H_2$, CO, and syngas plants use natural gas, methane, or impure $H_2$ as feedstock, and consume power, water, and other utilities. In addition, a production plant may use a consumable catalyst, which may also be considered a raw material cost in the context of this application. The cost of some raw materials may be the same across the various production plants, or may be different for each production plant. Thus, in a preferred embodiment, a raw material cost structure for each raw material of each production plant is obtained by the production planning system 100. In another preferred embodiment, a raw material cost structure comprises a plurality of raw material costs, wherein a first raw material cost varies with varying consumption and a second raw material cost is an average forecasted cost. In yet another embodiment, a cost structure comprises a plurality of raw material costs, wherein a plurality of raw material costs vary with varying consumption. A raw material may be supplied by different suppliers at different cost.

The value of by-products produced by each of the production plants is also obtained by the production planning system 100. The value of the by-products typically depends on the particular by-product itself, the quantity of by-products consumed or sold, and the production value or sales price of those by-products at that particular location. In one embodiment, the by-product produced, value, and/or quantity of by-product varies from location to location, thus a different value is obtained for each production plant. Furthermore, in one embodiment, the value of the by-product varies with varying production quantities. The value of the by-product is expressed as a total value or as a value per unit of product. Typical by-products of CO, $H_2$, and/or syngas plants include steam, $CO_2$, NOx, SOx, fuel gas, and others. The value of a by-product may also be expressed as a negative value reflecting a cost of disposing of undesirable by-products, such as waste water, solid waste, $CO_2$, liquid waste, or gaseous waste is included in some preferred embodiments. Alternatively, the cost of disposing of by-products can be independently input into the production planning system 100 as a cost.

In one preferred embodiment, the forecast consumption of product by each customer is also obtained by the production planning system 100. The forecast consumption may be determined by various methods, such as historical predictions, orders, contracts, or any other sources. The forecast consumption may be input manually into the production planning system 100, or may be read from an external source, such as a production planning database.

A preferred embodiment of the production planning method also obtains a forecast production availability of each production plant. Forecast production availability is preferably expressed as a yes/no signal representing a production plant being in or out of service, and more preferably is a number representing the forecast production quantity available from each plant for the planning period. Alternatively, the forecast production availability may be expressed as a minimum and maximum value for the availability of production. With the forecast production availability, the production planning system 100 accounts for outages or other factors affecting the production capability of each production plant.

A production capacity for each of the production plants/units is also obtained by the production planning system 100. The production capacity is preferably a nameplate or proven production capacity of each system, and more preferably a value representing a current capacity of each plant. Alternatively, the production plants send data related to a capacity constraint or multiple parameters related to capacity constraints, and the production planning system 100 calculates a constrained production capacity.

In one preferred embodiment of the method, the production planning system 100 obtains at least one process operating parameter for each of the production plants. The process operating parameter is preferably related to the quantity of production a particular plant. Even more preferred is obtaining a plurality of process operating parameters for each plant. The process operating parameters are preferably parameters used in process modeling or production planning.

In one preferred embodiment, a cost and availability of purchased product from outside sources is also obtained by the production planning system 100. The product availability is a quantity of product available from a single outside source, a number of outside sources, or a quantity of product available from each of a number of outside sources. The cost of purchased product is preferably obtained for each outside supplier providing purchased product to the distribution network, but can also be an average cost. Furthermore, in one embodiment, the cost of purchased product is a purchased product cost structure that varies as the consumption varies as described for the raw material cost structure above. As used herein, purchased product means product bought from an outside source. An outside source is any source of product that is not a production plant under the control or direction of the production planning system 100.

Figure 4:
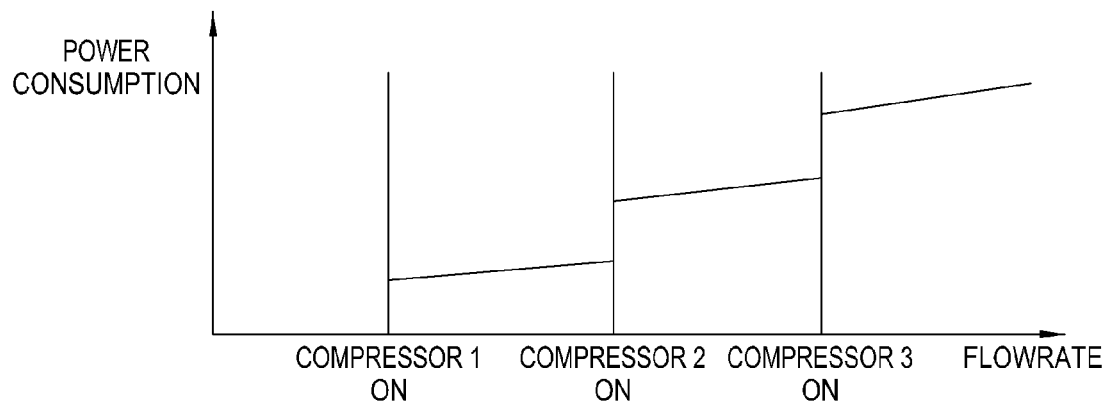
FIG. 4 is a graphical representation of a distribution network operating cost for one embodiment of the invention.

The current method also obtains a network operating parameter from the distribution network. The network operating parameter can be any parameter related to the operation of the distribution network, and is preferably a parameter related to the distribution network operating cost and the operation of equipment in the distribution network. In one preferred embodiment, the network operating parameter relates to the on/off state of equipment, the quantity of product flowing through the equipment, the raw material consumed by equipment, and/or losses in the distribution network. In one even more preferred embodiment, a plurality of process operating parameters for the distribution network is obtained. The network operating parameters are preferably parameters used in process modeling, costs modeling, or production planning. For a petrochemical product delivered by pipeline, the distribution network operating cost can include the cost of compression or pumping of the product. In one embodiment of the invention, the cost of compression varies with varying demand of product as shown in FIG. 4. In this embodiment, there is a minimum cost of electricity to start and maintain a compressor operating at a minimum level. Then, after the demand exceeds a certain quantity, the cost of compression (primarily the cost of electricity) increases proportional to the demand. In one preferred embodiment of the current invention, the cost of operating compressors is accurately modeled in the cost model when calculating the total network variable cost. Other parameters can be included to model closely the electricity consumption of the network devices.

Referring again to FIG. 2, the production planning system 100 reads a plurality of current data values 220 comprising:
a) a real-time production rate for each of the production plants 224;
b) a real-time consumption for each of the customers 226, 910; and
c) a real-time network operating parameter 228.

Alternatively, the plurality of current data values 220 may further comprise a real-time target. The current data values 220 are preferably real-time data values supplied by each production plant, each customer, and the distribution network. As used herein, real-time data is preferably instantaneous data values, and more preferably, a recent time-averaged data value, such as a 6 minute average, 15 minute average, or hourly average. Alternatively, the real-time data can be over several hours or days, depending on the time step selected for production planning. As used herein, a real-time production rate is the current data value representing a quantity of production or a rate of production over a specified time step of the desired product from each production plant. Similarly, a real-time consumption is the current data value representing a quantity of product consumed or a rate of product consumption over a specified time step for each customer. Finally, a real-time distribution network operating parameter is a current data value representing an operating parameter of the distribution network. The real-time distribution network parameter is preferably related to the distribution network operating cost and/or the ability of the distribution network to supply product to customers. In one preferred embodiment, the distribution network is a pipeline, and the real-time distribution network parameter is the pressure in the pipeline. In another embodiment, the real-time distribution network parameter is the quantity of a raw material being consumed by the distribution network. The current data values 220 may also comprise real-time outside source supply rate indicating how much product is coming into the distribution network from sources not under the control or direction of the production planning system 100.

Still referring to FIG. 2, the production planning data values 210 and the current data values 220 are input to the production planning system 100. In one preferred embodiment, the production planning system 100 calculates, for a time step specified by the user, a plurality of target network production values 230 and a plurality of plant production values 240. The target plant production values 240 are calculated for each of the production plants. Furthermore, the production planning system 100 calculates the target network production values 230 and the target plant production values 240, wherein a total network variable cost is minimized by an optimization calculation. Production values may be expressed as a total amount of production for the specified period, or as a production rate.

The target plant production values 240 comprise:
a) a plant production quantity; and
b) a plant variable cost.

The target plant production values 240 are preferably calculated for at least one production plant, more preferably for a plurality of production plants, and even more preferably for each production plant in the system. In another embodiment, the production planning system 100 calculates the variable cost of production for a given plant production quantity.

The plant production quantity is the total amount of product to be produced by a production plant for the specified time step. The production planning system 100 calculates a plant production quantity for each production plant for the time period specified by the user. The plant production quantity is the amount of production that is allocated to each plant to fulfill the expected production needs and is calculated by a network production optimization program 704. The production demand is allocated among the production plants based on system inventory, plant availability, plant efficiencies, predicted variable costs, and expected customer demand such that the total network variable cost is minimized.

The plant variable cost is the amount of variable cost attributable to producing the plant production quantity. The plant variable cost is preferably the actual cost to produce product at the production rate required by the forecasted demand quantities 908, and preferably takes into account the value of any by-products produced. In one embodiment, the raw material cost structure (described above) is used to characterize the variable cost of the raw materials of the varying production quantities of a time step in a plant cost program 702. The plant variable costs typically, but not necessarily, vary significantly at various production rates and between various production units depending on plant conditions, plant efficiencies and many other factors. Thus, in one embodiment of the method, the production planning system 100 calculates a plant variable cost for each production plant at the respective plant production quantity.

The production planning system 100 preferably outputs the plant production quantity for at least one production plant, and more preferably for each of the production plants for the specified time step. As previously described, the plant production quantity for each plant is optimized to minimize the total network variable costs across the entire distribution network. Thus, operating the production plants at the calculated plant production quantity minimizes the total network variable cost.

The target network production values 230 comprise:
a) a total network production quantity and
b) the total network variable cost;

The total network production quantity is the amount of product to be supplied by the distribution network to all customers combined. The total network variable cost preferably comprises a sum of the variable cost of all the production plants, and the distribution network operating cost. Total network variable costs can be expressed as a total quantity or as a cost per unit of production.

In one embodiment, the target network production values further comprises a unit (i.e., compressors, dispatch) production quantity and a unit cost.

In another embodiment, the target network production values further comprise a purchased production quantity. The purchased production quantity is a target amount of product to be purchased from an outside source. The production planning system 100 calculates the purchased production quantity based on minimizing the total network variable cost. Typically, but not necessarily, a lower purchased production quantity will result in lower total network variable cost. However, because there may be take-or-pay contracts, or other cost considerations, there may be a minimum quantity that is purchased before producing the product in a production plant.

One embodiment of the current method uses the production planning system 100 to calculate the variable cost of the production plants and distribution network over a selected time period. These variable costs are then used to calculate an optimized production plan. The optimized production plan is preferably a daily, weekly, monthly, or quarterly plan, but can also be any other time period suitable for the process of interest. Finally, the production planning system 100 generates, for each production plant, a plant production quantity, and the associated cost of production, wherein the total network variable cost is minimized for the selected time period.

The production target is preferably for the next three-hour production period, but can be a daily, weekly, monthly, or any other suitable production period.

The production planning system 100 utilizes any commercial process modeler in conjunction with any commercial optimizer known to one of ordinary skill in the art. One embodiment of the method uses an AMPL or MOSEL-based commercial modeler in conjunction with an optimization solver, such as KNITRO 3.0, Xpress MP, or CPLEX, for the cost and planning calculations respectively. Process models and optimization programs are customized for a given system of production plants and distribution networks by one of ordinary skill in the particular area of interest.

In another embodiment of the current method, the production planning system 100 comprises a plant cost program, a network production optimization program, and a network real-time operation program. The three programs are interactive and determine the plant cost, an optimized production plan, and a real-time production target respectively.

The plant cost program can be any program known to one of ordinary skill in the art for calculating variable costs of the particular plants of interest. In one embodiment, a process-based model, preferably an AMPL or MOSEL-based modeler, is used to calculate plant variable cost. In one embodiment, the plant cost model optimizes key processes parameters. In an other embodiment, the production planning system 100 coordinates two production planning: the first one calculates the production quantity for the coming week and the second one calculates the production quantity for the days of the week. Other embodiments use a linear programming or a spreadsheet program. In one embodiment of the invention, the plant variable cost 800 for a production plant is calculated by:
a) calculating a preliminary plant production quantity for the production plant;
b) inputting the planned plant production quantity 802 into a process-based model to calculate a mass balance across the production plant, wherein a quantity of a raw material required to produce the plant production quantity 804 and a quantity of plant by-product produced 806 is determined;
c) applying the raw material cost structure to said quantity of raw material required to calculate a cost of a raw material; and
d) calculating a preliminary plant variable cost.

In another preferred embodiment, the plant cost program calculates the plant variable cost for each production plant, the distribution network variable cost, and the total network variable cost.

The network production optimization program can be any commercial solver known to one of ordinary skill in the art and suitable for the particular production optimization of interest. One preferred embodiment uses an optimization algorithm based on KNITRO 3.0, a commercial non-linear optimization solver. Another embodiment uses XPRESS MP or CPLEX for a linear integer mixed programming. The network production optimization program of one preferred embodiment calculates the plant production quantity, for each production plant that minimizes the total network variable cost. In one embodiment, the total network variable cost is minimized by inputting the preliminary plant production quantity and the preliminary plant variable cost for each production plant into the network production optimization program and calculating the total network production quantity. The optimization program is configured to compare the preliminary plant production quantity and preliminary plant variable cost for each production plant and determine a plant production quantity for each plant that minimizes the total network variable cost.

The network real-time operation program is any operation program known to one of ordinary skill in the art capable of executing process operation control programs. The network real-time operation program outputs a target production quantity for each production unit to optimize the cost of production considering the plant production plan and the past, current and forecast data values (production flow rates, customer consumptions and pipeline pressures). Considering the pressure data in real time operation add one degree of freedom in the problem of cost optimization described above. In one embodiment, a next three-hour plant production target for each production plant is calculated and outputted based on past, current and forecast data values. In another embodiment, a next three-hour plant production target is calculated and outputted for each production plant based on real-time customer past, current and forecast data values, maintenance of production plants and compressors, and availability of product from outside sources.

In one preferred method, the production setpoint of at least one production plant is set to achieve the target production quantity for the respective production plant. More preferably, the production setpoints of a plurality of production plants are set to achieve the production targets for the respective production plants. Even more preferably, the production setpoints of all of the production plants are set to achieve the production target for the total network.

The actual production rate of a production plant is input into an automated control system that controls actual production rate to a production setpoint. The setpoint of the automated control system is preferably set considering the plant production capacity to substantially achieve the plant production quantity over the time period. More preferably, the setpoint of the automated control system is preferably set considering the plant production capacity to substantially achieve the plant production quantity over the time period and is electronically transmitted from the production planning system 100 to an automated control system.

To substantially achieve the plant production quantity, a local automated control system may have to vary the instantaneous production setpoint of the respective production plant. In one embodiment of the method, the production planning system 100 outputs a three-hour production target and a production plant is automatically controlled to achieve the production target. In this embodiment, the production planning system 100 electronically transmits a three-hour production target to a local automated control system. This three-hour production target is a total quantity of product to be produced over the next three-hour period. As used herein, substantially achieving a production quantity means that an approximate desired quantity of production is produced over the desired time period, taking into account the normal variations of production control, inventory, and measurement inaccuracies.

In another embodiment of the method, the production planning system 100 continually reads at least one of the current data values 220, calculates the plant production quantity for at least one production plant, and updates the production target for at least one production plant. As used herein, continually means that the production planning system 100 is running in real time while the system is in operation (except for planned and un-planned downtime of the production planning system), reads data, and performs calculations on a specified frequency that allows the proper control of the distribution network. In one embodiment, the production planning system 100 reads data and executes a new calculation typically every minute. In yet another embodiment of the method, the production planning system 100 continually reads the real-time production rate for each production plant, the real-time consumption of each customer and at least one real-time network operating parameter, such as a pipeline pressure, calculates the plant production quantity for at least one production plant, and updates the production target for at least one production plant.

Although the present invention has been described in considerable detail with reference to certain preferred versions and examples thereof, other versions are possible. For instance, although one preferred embodiment calculates a daily production plant, the production planning system can also be used to produce production plan for periods of weeks, months, years, or other suitable time frames. Furthermore, the current invention may be used in a variety of processes, such as oxygen/nitrogen production, $H_2/CO$ production, electricity/heat cogeneration, electrical power supply, or other processes with a number of production facilities linked to customers by a common distribution network. Thus, the present invention is not intended to be limited to the specific embodiments in the examples given above.

What is claimed is:

1. A computer implemented method of controlling production within a network of production plants to produce and distribute a product to a network of customers, said method comprising:

a) obtaining a plurality of planning data values for a given period of time, said planning data values including at least:

i) a plurality of raw material cost structures for raw materials used in the production of the product, wherein each raw material cost structure specifies one or more parameters of a take-or-pay supply contract between a production plant and a raw material supplier; including at least one of a raw material price, a raw material quantity specified in the take-or-pay contract, a maximum contracted consumption rate, an energy adjustment, a series of prices based on quantity of usage, a forecast price for a raw material, and a spot price;

ii) a value of one or more by-products for each of a plurality of production plants within said network of production plants, wherein each by-product results from processing the raw materials used in the production of the product, and wherein the value for a given by-products specifies a cost of processing that by-product;

iii) a forecast consumption for each of said customers;

iv) a forecast production availability for each of said production plants or a forced production plan;

v) a production capacity for each of said production plants;

vi) a cost of the product;

vii) an availability of the product; and b) reading a plurality of current data values including at least:

i) a real-time production rate for each of said production plants; and ii) a real-time consumption for each of said customers; and c) inputting said planning data values and said current data values into a production planning system;

d) calculating from said inputted planning data values and said current data values:

i) a total network variable cost, wherein the total network variable cost specifies:
   i) a plant production quantity;
   ii) a plant variable cost;
   iii) a total network production quantity; and
   iv) the total network variable cost;
e) controlling production within the network of production plants by outputting a plant production quantity for each of said production plants on the basis of the total network variable cost.

2. The method of claim 1, wherein said production planning system comprises a plant cost program, a network production optimization program, and a network real-time operation program, wherein:
   a) said plant cost program calculates:
      i) a plant variable cost for each of said production plants; and
      ii) said total network variable cost;
   b) said network production optimization program calculates:
      said plant production quantity for each of said production plants; and
   c) said network real-time operation program calculates a targeted plant production quantity for each production plant.

3. The method of claim 2, wherein said plant variable cost is calculated for a given production plant by:
   a) inputting a planned plant production quantity into a process-based model to calculate a mass balance across said given production plant, a quantity of a raw material required to produce said planned plant production quantity, and a quantity of plant by-product produced; and
   b) calculating a preliminary plant variable cost from said mass balance across said given production plant, said quantity of the raw material required to produce said planned plant production quantity, and said quantity of plant by-product produced.

4. The method of claim 2, further comprising:
   a) continually reading at least one of said current data values;
   b) continually calculating said plant production quantity for at least one of said production plants; and
   c) updating said plant production quantity of said at least one production plant.

5. The method of claim 4, wherein said real-time production rate is continually read for each of said production plants.

6. The method of claim 5, wherein said real-time consumption is continually read for each of said customers.

7. The method of claim 6, wherein said product comprises a hydrogen product and a carbon monoxide product.

8. The method of claim 1, wherein said production plants produce a hydrogen product and a carbon monoxide product.

9. The method of claim 1, wherein said total network variable cost is minimized.

10. The method of claim 1, wherein the raw material cost structure further specifies a contract volume purchased on a contract price and a spot volume purchased on a spot price, and is represented by the formula:

$$C = p_{contract} \times V_{contract} + p_{spot} \times V_{spot}$$

wherein C is the raw material cost structure, $p_{contract}$ is the contract price, $V_{contract}$ is the contract volume, $p_{spot}$ is the spot price, and $V_{spot}$ is the spot volume.

11. The method of claim 1, wherein the by-products include at least one of waste water, solid waste, $CO_2$, liquid waste, and gaseous waste.

12. A computer implemented $H_2$/CO production load planning method for a plurality of production plants, comprising:
   i) inputting as inputs to a system: $H_2$ and CO current consumption from consumers connected to the plurality of production plants by a network of pipelines configured for delivery of the $H_2$ and CO, forecasts of demand for $H_2$ and CO from consumers, and $H_2$ purchase price, a plurality of raw material cost structures for the raw materials used in the production of the $H_2$ and CO, wherein each raw material cost structure specifies one or more parameters of a take-or-pay supply contract between a production plant and a raw material supplier, and a value of one or more by-products for each of a plurality of production plants within said plurality of production plants, wherein each by-product results from processing the raw materials used in the production of the product, and wherein the value for a given by-products specifies a cost of processing that by-product; and
   ii) on the basis of the inputs, generating a production plan that allocates production for each of the plurality of production plants in a manner that minimizes variable costs associated with producing the $H_2$ and CO.

13. The method of claim 12, wherein generating comprises computing a weekly planning of production for each plant.

14. A computer implemented method of calculating production for a plurality of production plants within a network of production plants, comprising:
   a) obtaining a plurality of planning data values, a plurality of current data values, and a plurality of past data values, wherein the plurality of planning data values includes at least:
      i) a plurality of raw material cost structures for the raw materials used in the production of the product wherein each raw material cost structure specifies one or more parameters of a take-or-pay supply contract between a production plant and a raw material supplier; including at least one of a raw material price, a raw material quantity specified in the take-or-pay contract, a maximum contracted consumption rate, an energy adjustment, a series of prices based on quantity of usage, a forecast price for a raw material, and a spot price;
      ii) a value of one or more by-products for each of a plurality of production plants within the network of production plants wherein each by-product results from processing the raw materials used in the production of the product, and wherein the value for a given by-products specifies a cost of processing that by-product;
      iii) a forecast consumption for each of the consumers;
      iv) a forecast production availability for each of the production plants or a forced production plan;
      v) a production capacity for each of the production plants;
      vi) a cost of the product;
      vii) an availability of the product; and
   b) calculating a plant production quantity for each plant that minimizes variable costs at each production plant based upon the obtained data.

15. The method of claim 14, wherein the raw material cost structures further include a contract volume purchased on a contract price and a spot volume purchased on a spot price, and is represented by the formula:

$$C = p_{contract} \times V_{contract} + p_{spot} \times V_{spot}$$

wherein C is the raw material cost structure, $p_{contract}$ is the contract price, $V_{contract}$ is the contract volume, $p_{spot}$ is the spot price, and $V_{spot}$ is the spot volume.

16. The method of claim 14, wherein the past data values comprise a past consumption of raw material.

17. The method of claim 14, wherein the production plants produce a hydrogen product and a carbon monoxide product.

18. The method of claim 14, wherein the current data values are selected from the group comprising:
   i) a real-time production rate for each of the production plants;
   ii) a real-time consumption for each of the consumers; and
   iii) combinations thereof.

19. The method of claim 14, wherein the by-products include at least one of waste water, solid waste, $CO_2$, liquid waste, and gaseous waste.

20. A computer implemented method of controlling production within a network of production plants to produce and distribute a product to a network of consumers, the method comprising:
   i) obtaining a plurality of planning data values over a time step;
   ii) reading a plurality of current data values;
   iii) inputting the planning data values and the current data values into a production planning system;
   iv) calculating a total network production quantity based upon the planning data values and the current data values input to the production planning system; and
   v) calculating a plant production quantity for each production plant based upon the total network production quantity, wherein the plant production quantities are calculated to minimize variable costs associated with production of the product at each production plant.

21. The method of claim 20, wherein the planning data values are selected from the group comprising:
   i) a raw material cost structure for the raw materials used in the production of the product;
   ii) a value of a by-product for each of a plurality of production plants within the network of production plants;
   iii) a forecast consumption for each of the consumers;
   iv) a forecast production availability for each of the production plants or a forced production plan;
   v) a production capacity for each of the production plants;
   vi) a cost of the product;
   vii) an availability of the product; and
   viii) combinations thereof.

22. The method of claim 21, wherein the raw material cost structure comprises a contract volume purchased on a contract price and a spot volume purchased on a spot price, and is represented by the formula:

$$C = p_{contract} \times V_{contract} + p_{spot} \times V_{spot}$$

wherein C is the raw material cost structure, $p_{contract}$ is the contract price, $V_{contract}$ is the contract volume, $p_{spot}$ is the spot price, and $V_{spot}$ is the spot volume.

23. The method of claim 20, further comprising inputting a plurality of past data values into the production planning system.

24. The method of claim 23, wherein the past data values comprise a past consumption of raw material.

25. The method of claim 20, wherein the production plants produce a hydrogen product and a carbon monoxide product.

26. The method of claim 20, wherein the current data values are selected from the group comprising:
   i) a real-time production rate for each of the production plants;
   ii) a real-time consumption for each of the consumers; and
   iii) combinations thereof.

27. The method of claim 20, wherein the by-products include at least one of waste water, solid waste, $CO_2$, liquid waste, and gaseous waste.

* * * * *